United States Patent

[11] 3,548,797

| [72] | Inventors | Muraji Hagihara<br>Hitachi-shi, Japan;<br>Hisanori Moriya, Katsuta-shi, Japan |
|---|---|---|
| [21] | Appl. No. | 765,880 |
| [22] | Filed | Oct. 8, 1968 |
| [45] | Patented | Dec. 22, 1970 |
| [73] | Assignee | Hitachi Ltd.<br>Chiyoda-ku, Tokyo, Japan<br>a corporation of Japan |
| [32] | Priority | Oct. 9, 1967 |
| [33] | | Japan |
| [31] | | No. 42/85668 |

[54] FUEL EVAPORATION PREVENTING DEVICE
2 Claims, 5 Drawing Figs.

[52] U.S. Cl. ..................................... 123/136,
123/119, 261/72
[51] Int. Cl. .......................................F02m 19/00
[50] Field of Search........................... 123/119,
136; 261/70, 72

[56] References Cited
UNITED STATES PATENTS

| 2,894,734 | 7/1959 | Wentworth.................. | 261/72X |
| 2,905,013 | 9/1959 | Goetz........................... | 261/72X |
| 3,093,124 | 6/1963 | Wentworth.................. | 123/136 |
| 3,460,522 | 8/1969 | Kittler et al.................. | 123/136 |

*Primary Examiner*—Laurence M. Goodridge
*Attorney*—Craig, Antonelli, Stewart & Hill ABSTRACT: A fuel evaporation preventing device for preventing a fuel, evaporating from a fuel tank and a carburetor of an automotive vehicle, from being released into and polluting the atmosphere, said device including a fuel vapor absorption tank in communication with a fuel bowl of the carburetor through a pressure regulating valve and said pressure regulating valve being integrally incorporated in the carburetor, whereby the length of air vent pipe is made shorter than that in a conventional device of this type and thereby an adverse effect which would other wise be imposed on the fuel flow characteristic of the carburetor can be eliminated.

3,548,797

FUEL EVAPORATION PREVENTING DEVICE

BACKGROUND OF THE INVENTION

1. Field of the Invention

The present invention relates to a fuel evaporation preventing device for use in the fuel supply system in an engine and more particularly to such fuel evaporation preventing device which enables the length of air vent passage to be shortened and thereby eliminates an adverse affect which would otherwise be imposed on the fuel flow characteristic of a carburetor.

2. Description of the Prior Art

As means for preventing a fuel, evaporating from the fuel tank and the carburetor of an automotive vehicle, from being released into the atmosphere and polluting air, there has been known a device wherein the vaporized fuel is adsorbed by an adsorbent, e.g. charcoal, when the engine is not in operation, but is desorbed from the adsorbent and sucked into the engine when the engine is in operation.

On the other hand, carburetors are generally provided with an air vent pipe communicating the downstream side of an air cleaner and a fuel bowl with each other to make up the fuel flow characteristic of engine. In combining the air vent pipe with the aforesaid fuel adsorbing means, a pressure control valve must be provided therebetween so as to close the air vent pipe and thereby lead the fuel, vaporized in the fuel bowl, toward the adsorbent. In a device of this type, therefore, the length of the air vent pipe during operation of the engine becomes considerably longer and more complicated than the ordinary air vent pipe of carburetor.

Type of ventilating the fuel bowl in a carburetor is not only important for compensating mixture ratio caused by clogging of the air cleaner but also closely related to the flow characteristic of the carburetor. Namely, the pulsating wave of suction pressure of the engine is propagated to the carburetor and pulsating pressures of different phases are developed at a fuel nozzle and the open end of the air vent pipe. The pulsating pressure at the open end of the air vent pipe is further propagated into the fuel bowl through said air vent pipe, and the phase difference and the amplitude of said pressure wave are variable depending upon the length and the flow resistance of the air vent pipe. The flow rate of the fuel being ejected through the nozzle is determined by the difference between the pulsating pressure acting in the fuel bowl and the pulsating pressure acting on the nozzle. Practically, the number of revolutions of engine at which the ratio of the pressure amplitude in the floating chamber to the pressure amplitude at the nozzle becomes highest, varies according to the length of air vent pipe, the number of revolutions becoming smaller as the air vent pipe also becomes longer. The length of the air vent pipe also has a bearing on the fuel flow characteristic of carburetor, namely the quantity of fuel flow becomes short in the low r.p.m. region as the length of air vent pipe becomes longer.

The region of engine r.p.m. wherein fuel flow quantity becomes short, is shifted not only by the length of air vent pipe but also be the length of the suction system. However, no shortage of fuel and therefore no lowering of output will occur in the normal operation range of the engine if the length of the air vent pipe is shorter than a predetermined value.

SUMMARY OF THE INVENTION

The object of the present invention is to eliminate the above-described drawbacks by incorporating the pressure control valve in the carburetor in a unitary form and thereby shortening the length of air vent passage, and further to make the fuel evaporation preventing and fuel recovering device, including the carburetor, compact in form as a whole.

BRIEF DESCRIPTION OF THE DRAWINGS

For the sake of understanding of the invention, reference is had to the following description taken in conjunction with the accompanying drawings, in which.

DESCRIPTION OF THE PREFERRED EMBODIMENTS

Figure 1:
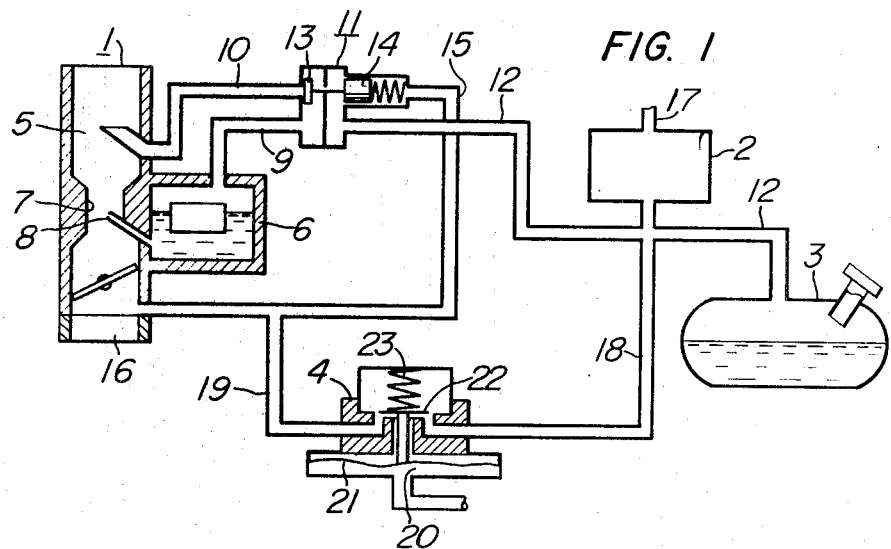
FIG. 1 is a diagrammatic view showing the structure of a conventional fuel evaporation preventing device.

Referring first to FIG. 1, reference numeral 1 designates a carburetor, 2 a tank, 3 a fuel tank and 4 a discharge regulating valve by which the quantity of a fuel vapor being released from the adsorption tank upon desorption during operation of an engine and the duration of such fuel vapor releasing are regulated. The carburetor 1 comprises an air intake 5, a fuel bowl 6, a venturi 7 and nozzle 8, and the fuel bowl 6 and the air intake 5 are communicated with each other through vent pipes 9, 10. A pressure regulating valve 11 is provided between the vent pipes 9, 10, which simultaneously acts as a changeover valve to establish or break the communication between the vent pipe 9 and passage 12 which communicate the adsorption tank 2 with the 3. Namely, the pressure regulating valve includes a valve body 13 and a piston 14 integrally therewith, and said piston makes a reciprocatory movement, under a pressure from a intake manifold 16 acting thereon through a passage 15, to communicate the vent pipe 9 with either the vent pipe 10 or the passage 12. The adsorption tank 2 is communicated with the atmosphere through a passage 17, while said adsorption tank 2 and the fuel tank 3 are communicated with the intake manifold 16 through a passage 18, the discharge regulating valve 4 and a passage 19. The discharge regulating valve 4 is composed of a chamber 20 communicating with the exhaust pipe of engine, a diaphragm 21, a valve 22 integrally connected to said diaphragm and a spring 23.

With the arrangement described above, when the engine is inoperative, the atmospheric pressure appears in the intake manifold 16, so that the pressure regulating valve 11 closes the vent pipe 10 and the fuel bowl 6 is communicated with the adsorption tank 2 through the passage 12. Thus, the fuel vapor in the fuel bowl 6 is led into the adsorption tank 2 and stored therein. Now, when the engine starts its operation, the pressure regulating valve 11 closes the passage 12 by reason of a negative pressure appearing in the intake manifold 16 and the fuel bowl 6 is communicated with the air intake 5 through the vent pipe 10, namely ventilation of air same as in the ordinary carburetor takes place through the vent pipes 9, 10. On the other hand, the valve 22 is opened by the exhaust pressure, communicating the adsorption tank 2 and the fuel tank 3 with the intake manifold 16 to provide for the suction of the fuel vapor into the engine.

Figure 4:
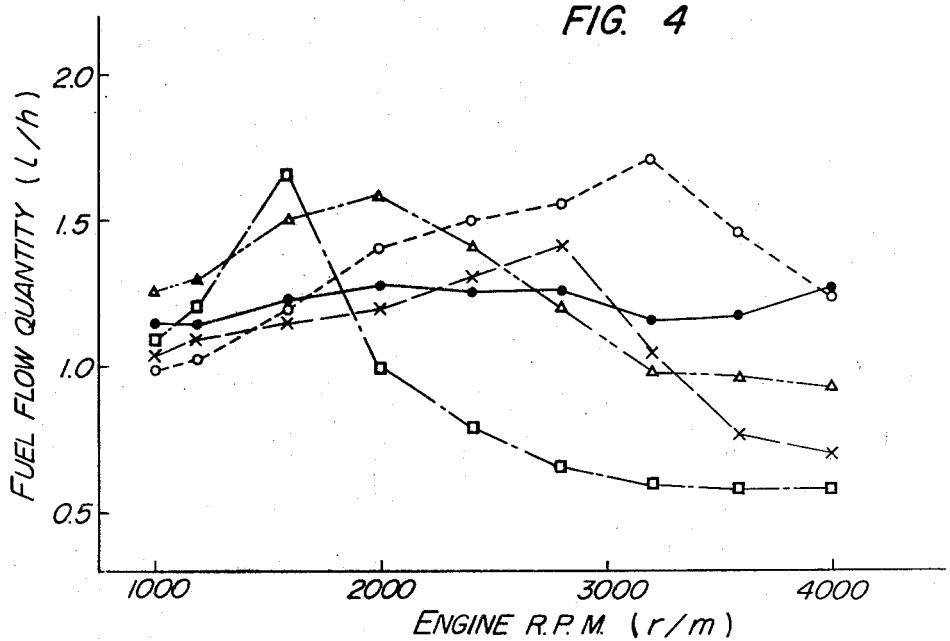
FIG. 4 is a chart graphically showing the relationship between the length of air vent pipe and the pressure amplitude ratio.
Figure 5:
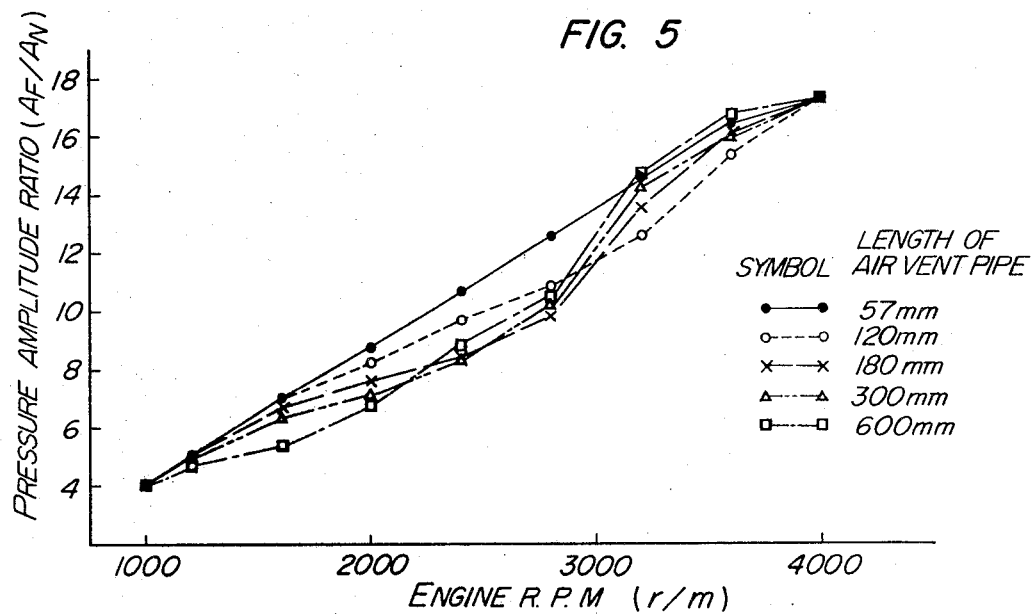
FIG. 5 is a chart graphically showing the relationship between the length of air vent pipe and the fuel flow characteristic.

As described above, in the conventional devices of this type it is common that the pressure regulating valve 11 and the carburetor 1 are provided separately and communicated with each other by means of a pipe. Such an arrangement brings about many advantages, such as that a conventional type of carburetor can be used by slightly modifying the same, that one type of pressure regulating valve can be used with a variety of carburetor and that the pressure regulating valve can be located in a space. On the other hand, however, the conventional device of the arrangement described gives an adverse affect on the flow characteristic of the carburetor because the vent pipes are complicated in shape and long in length. Namely, as shown in FIG. 4 which shows the ratio of the pressure amplitude $A_F$ in the fuel bowl to the pressure amplitude $A_N$ at the nozzle, actually measured while changing the length of the air vent pipe, the number of revolutions of engine at which the pressure amplitude ratio becomes highest varies according to the length of air vent pipe, and as shown in FIG. 5 which shows the result of an experiment conducted to examine the influence of the length of air vent pipe on the fuel flow characteristic of carburetor, the quantity of fuel flow becomes short in the low r.p.m. region as the length of air vent pipe becomes longer.

Figure 2:
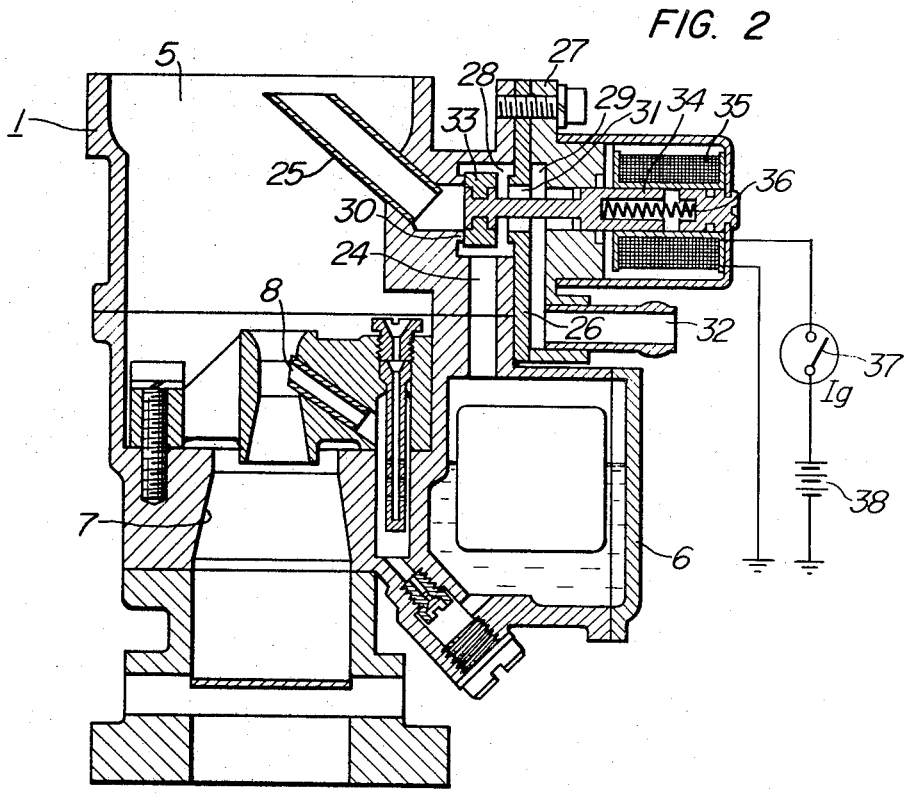
FIGS. 2 and 3 are fragmentary vertical cross-sectional views respectively showing the critical portions of embodiment of the fuel evaporation preventing device according to this invention.

The present invention contemplates the elimination of the aforesaid defects by incorporating the pressure regulating valve 11 in the carburetor in a unitary form. Namely, according to the present invention, as shown in FIG. 2, the fuel bowl 6 and the air intake 5 of the carburetor 1 are communicated with each other through a passage 24 extending through the wall of the carburetor and a vent pipe 25 provided in the body of carburetor. A casing 27 is fitted to the carburetor body with a partition member 26 interposed therebetween, and thereby chambers 28, 29 are formed. The partition member 26 is located in confronting relation to a valve seat 30 formed at the inner end of the vent pipe 25, and has an opening 31 bored therethrough whereby the chambers 28, 29 are communicated with each other. A pipe 32 which is connected to the adsorption tank at one end, has the other end connected to the casing for communication with the chamber 29. Between the valve seat 30 and the opening 31 in the partition member 26 is disposed a valve 33 which is carried on a plunger 34 integrally therewith. The plunger 34 is extending into a solenoid 35 and biased by a spring 36. A terminal of the solenoid 35 is electrically connected with an ignition switch 37. Reference numeral 38 designates a battery.

The fuel evaporation preventing device of the invention constructed as described above operates in the following manner: namely, the engine is out of operation, the ignition switch 37 is held in an open position and accordingly the solenoid 35 is deenergized, so that the plunger 34 is urged to the left under the biasing force of the spring 36, with the valve 33 resting on the valve seat 30 closing the vent pipe 25. In this position of the valve, the passage 24 is communicated with the chamber 29 and the pipe 32. Therefore, the fuel vapor formed in the fuel bowl 6 is led into the adsorption tank through the pipe 32.

When the engine is set in operation, the solenoid 35 is energized through the ignition switch 37, so that the plunger 34 is attracted to the right and thus the opening 31 in the partition member 26 is closed by the valve 33. In this position of the valve, the fuel bowl 6 is communicated with the air intake 5 through the passage 24 and the vent pipe 25. In this case, it is possible to make the total length of the passage 24 and the vent pipe 25 substantially the same as that of vent pipe in the conventional carburetor which has no fuel evaporation preventing device. Consequently, a satisfactory fuel flow characteristic of the carburetor can be obtained as shown in FIG. 5 by the solid line.

Figure 3:
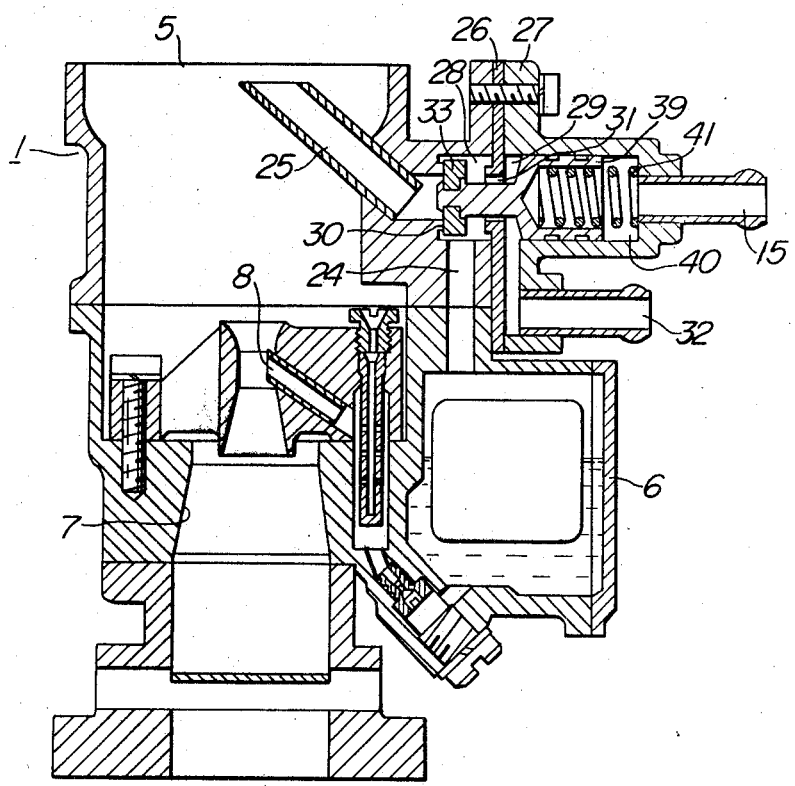

Another construction of the fuel evaporation preventing device of the invention is shown in FIG. 3. According to this construction, the valve 33 is integral with a piston 39 which is slidably fitted in a cylinder 40, communicating with the adsorption tank through a passage 15, and biased by a spring 41.

When the engine is out of operation, the piston 39 is urged to the left under the biasing force of the spring 41, so that the vent pipe 25 is closed by the valve 33 resting on the valve seat 30 and the fuel bowl 6 is communicated with the adsorption tank through the pipe 32. When the engine is in operation, however, the piston 39 is pulled to the right by a negative pressure appearing in the intake manifold, with the valve 33 closing the opening 31 in the partition member 26, and therefore the communication between the passage 24 and the vent pipe 25 is established. In the manner described, a short length of vent pipe is formed during the operation of engine, which enables a desirable fuel flow characteristic of carburetor to be obtained, and to lead the vaporized fuel in the fuel bowl into the adsorption tank when the engine is not in operation.

Although in the embodiments described and illustrated herein, use was made of the partition member 26 to form the chamber 28, 29, it is possible to form these chambers by connecting the casing 27 directly with the body of carburetor 1, without using the partition member, and to form the opening 31 therebetween.

Further, an empty tank of a predetermined volume, containing no adsorbent therein, may also be used as the adsorption tank.

The present invention is of great industrial advantage because according to the invention there are brought about the advantages, in addition to those mentioned above, that the pressure regulating valve can be integrated with the carburetor in a compact form and that the strength of the pressure regulating valve proper can be increased.

We claim:

1. A fuel evaporation preventing device comprising a casing connected to the body of a carburetor at a point immediately above a float chamber of the carburetor with a partition member interposed therebetween, a first and second chambers formed between said partition member and the carburetor body and between said partition member and the casing respectively, a passage extending through the carburetor body for communicating the first chamber with a fuel bowl and a vent pipe communicating said first chamber with an air intake, an opening bored through said partition member for communicating the first and second chambers with each other therethrough, a conduit having one end connected to said casing for communicating the second chamber with an adsorption tank, a valve being operative in such a manner that it closes said opening when said passage is desired to be communicated with said vent pipe and closes said vent pipe when said passage is desired to be in communication with said opening, and means disposed in said casing for operating said valve so as to keep the vent pipe closed when as associated engine is not in operation.

2. A fuel evaporation preventing device according to claim 1, wherein said means for operating the valve includes an electromagnetic element disposed in said casing and adapted to be operated according to engine operation, and means for cooperating said electromagnetic element with said valve.